(12) United States Patent
Kimtantas et al.

(10) Patent No.: US 12,312,248 B2
(45) Date of Patent: May 27, 2025

(54) SYSTEMS AND METHODS FOR AMMONIA PURIFICATION

(71) Applicant: Bechtel Energy Technologies & Solutions, Inc., Houston, TX (US)

(72) Inventors: Charles Kimtantas, Sugar Land, TX (US); Martin Taylor, Houston, TX (US)

(73) Assignee: Bechtel Energy Technologies & Solutions, Inc., Houston, TX (US)

( * ) Notice: Subject to any disclaimer, the term of this patent is extended or adjusted under 35 U.S.C. 154(b) by 0 days.

(21) Appl. No.: 18/864,785

(22) PCT Filed: Nov. 14, 2023

(86) PCT No.: PCT/US2023/037266
§ 371 (c)(1),
(2) Date: Nov. 11, 2024

(87) PCT Pub. No.: WO2024/107440
PCT Pub. Date: May 23, 2024

(65) Prior Publication Data
US 2025/0109029 A1    Apr. 3, 2025

Related U.S. Application Data

(60) Provisional application No. 63/425,583, filed on Nov. 15, 2022.

(51) Int. Cl.
*C01C 1/12* (2006.01)
*B01D 53/14* (2006.01)
(Continued)

(52) U.S. Cl.
CPC ............ *C01C 1/12* (2013.01); *B01D 53/1418* (2013.01); *B01D 53/1462* (2013.01);
(Continued)

(58) Field of Classification Search
CPC ......... C01C 1/12; C01C 1/10; B01D 53/1418; B01D 53/1462; B01D 53/1468;
(Continued)

(56) References Cited

U.S. PATENT DOCUMENTS

| 2,785,045 A | 3/1957 | Wu et al. |
| 3,383,173 A | 5/1968 | Bollen |

(Continued)

FOREIGN PATENT DOCUMENTS

| CN | 104355343 A | 2/2015 |
| CN | 106132873 A | 11/2016 |
| TW | 200607761 A | 3/2006 |

OTHER PUBLICATIONS

Taina Matos; International Search Report and Written Opinion for PCT/US23/37266; Jan. 19, 2024; 8 pages; United States Patent and Trademark Office as the International Search Authority; Alexandria, VA.

(Continued)

*Primary Examiner* — Anita Nassiri-Motlagh
(74) *Attorney, Agent, or Firm* — William P. Jensen; Crain Caton & James, P.C.

(57) ABSTRACT

The present disclosure generally relates to systems and methods for ammonia purification. More particularly, the systems and methods use a unique arrangement of a caustic wash, a water wash, an ammonia stripper and a caustic fractionator to recover ammonia otherwise lost during conventional purification.

20 Claims, 4 Drawing Sheets

(51) Int. Cl.
*B01D 53/18* (2006.01)
*B01D 53/52* (2006.01)
*B01D 53/62* (2006.01)
*B01D 53/78* (2006.01)
*C01C 1/10* (2006.01)

(52) U.S. Cl.
CPC ..... *B01D 53/1468* (2013.01); *B01D 53/1475* (2013.01); *B01D 53/1493* (2013.01); *B01D 53/18* (2013.01); *B01D 53/526* (2013.01); *B01D 53/62* (2013.01); *B01D 53/78* (2013.01); *C01C 1/10* (2013.01); *B01D 2251/304* (2013.01); *B01D 2251/306* (2013.01); *B01D 2257/304* (2013.01); *B01D 2257/306* (2013.01); *B01D 2257/504* (2013.01)

(58) Field of Classification Search
CPC ........... B01D 53/1475; B01D 53/1493; B01D 53/18; B01D 53/526; B01D 53/62; B01D 53/78
USPC ........................................................ 423/225
See application file for complete search history.

(56) References Cited

U.S. PATENT DOCUMENTS

2017/0073241 A1  3/2017  Taylor
2018/0296944 A1  10/2018  Taylor et al.

OTHER PUBLICATIONS

Taiwan Office Action; Intellectual Property bureau of the Ministry of Economic Affairs; Aug. 28, 2024; 13 pages; Taiwan.

SYSTEMS AND METHODS FOR AMMONIA PURIFICATION

RELATED APPLICATIONS

This application is a U.S. National Stage Application of PCT Application Serial No. PCT/US23/37266 filed on Nov. 14, 2023, which claims priority to U.S. Provisional Application No. 63/425,583, filed Nov. 15, 2022, which are each incorporated herein by reference.

FIELD OF THE DISCLOSURE

The present disclosure generally relates to systems and methods for ammonia purification. More particularly, the systems and methods use a unique arrangement of a caustic wash, a water wash, an ammonia stripper and a caustic fractionator to recover ammonia otherwise lost during conventional purification.

BACKGROUND

Conventional ammonia purification attempts to first separate ammonia (NH3) and hydrogen sulfide (H2S) from a refinery or chemical plant sour water stream, which often encounters difficulties in achieving a good separation of the hydrogen sulfide from the ammonia. This usually occurs when a simple two column sour water stripping system is used that generates a primarily hydrogen sulfide stream in the first column and a primarily ammonia stream in the second column. In addition, conventional ammonia purification processes often lose a certain amount of ammonia during the purification.

BRIEF DESCRIPTION OF THE DRAWINGS

The detailed description is described below with reference to the accompanying drawing, in which like elements are referenced with like reference numbers, and in which.

DETAILED DESCRIPTION OF THE ILLUSTRATIVE EMBODIMENTS

Figure 1A:
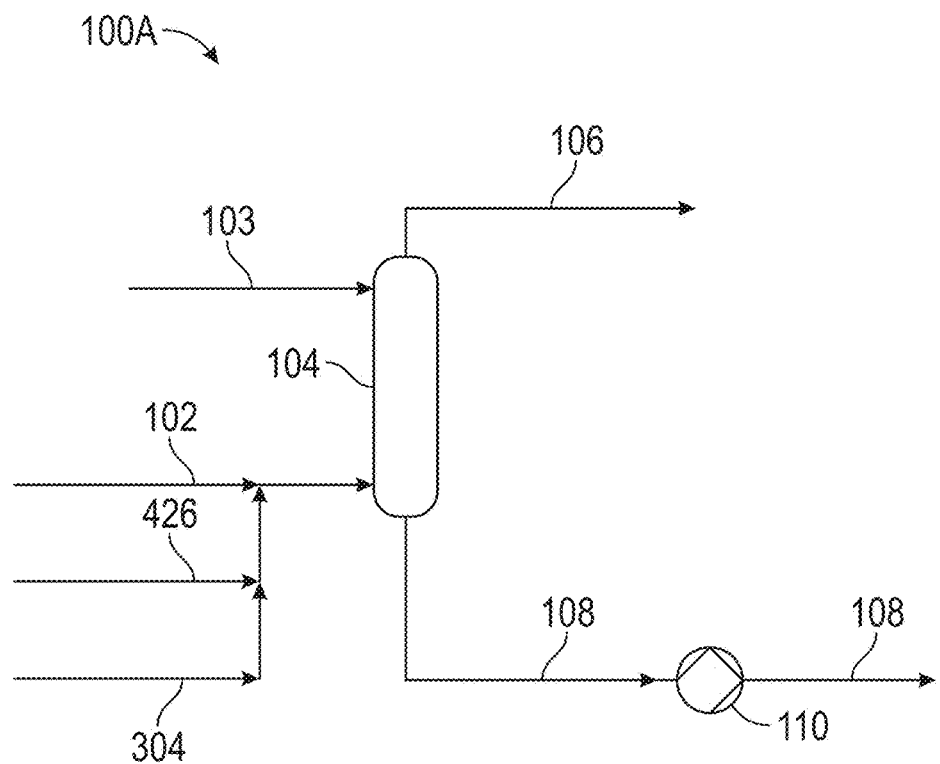
FIG. 1A is a schematic diagram illustrating one embodiment of a caustic scrubber system with a caustic wash for ammonia purification.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures and dimensions described herein are only exemplary and are not intended to assert or imply any limitation with regard to the environment, architecture, design, or process in which different embodiments may be implemented. To the extent that temperatures and/or pressures are referred to in the following description, those conditions are merely illustrative and are not meant to limit the disclosure. All streams described herein are carried by physical lines.

The systems and methods disclosed herein overcome the disadvantages encountered by conventional ammonia purification processes by using a unique arrangement of a caustic wash, a water wash, an ammonia stripper, and a caustic fractionator to recover ammonia otherwise lost during conventional purification. The disclosed systems and methods remove the residual hydrogen sulfide, carbon dioxide, mercaptans and other contaminants from the ammonia-rich stream to generate a high-quality anhydrous ammonia product stream that can be sold as an ammonia commodity product. The use of a base (sodium hydroxide or potassium hydroxide) to clean up another base (ammonium hydroxide) and the recovery of ammonia from the spent caustic is also unique.

In one embodiment, the present disclosure includes a system for ammonia purification, which comprises: i) a caustic scrubber in fluid communication with a feed gas stream, a caustic solution stream, a first ammonia vapor stream and a second ammonia vapor stream for producing a scrubbed ammonia stream and a spent caustic stream; ii) a compression train system with at least two compression stages for separating the scrubbed ammonia stream into a non-condensable vapor stream and an anhydrous ammonia liquid product stream; iii) an ammonia stripper for separating a sour water liquid stream into the first ammonia vapor stream and a liquid effluent stream; iv) a caustic fractionator in fluid communication with the spent caustic stream for producing a liquid bottom stream and an overhead vapor stream; v) a condenser in fluid communication with the overhead vapor stream for producing a two-phase stream comprising water and ammonia; and vi) a reflux drum for separating the two-phase stream into a liquid water stream and the second ammonia vapor stream.

In another embodiment, the present disclosure includes a method for ammonia purification, which comprises: i) introducing a feed gas stream, a caustic solution stream, a first ammonia vapor stream and a second ammonia vapor stream into a caustic scrubber for producing a scrubbed ammonia stream and a spent caustic stream; ii) separating the scrubbed ammonia stream into a sour water liquid stream, a non-condensable vapor stream and an anhydrous ammonia liquid product stream; iii) separating the sour water liquid stream into the first ammonia vapor stream and a liquid effluent stream; iv) introducing the spent caustic stream into a caustic fractionator for producing a liquid bottom stream and an overhead vapor stream; v) introducing the overhead vapor stream into a condenser for producing a two-phase stream comprising water and ammonia; and vi) separating the two-phase stream into a liquid water stream and the second ammonia vapor stream.

Caustic Scrubber System

Referring now to FIG. 1A, a schematic diagram illustrates one embodiment of a caustic scrubber system 100A with a caustic wash for ammonia purification. A feed gas stream 102 comprising hydrogen sulfide, carbon dioxide, mercaptans, other contaminants and ammonia passes through a caustic scrubber 104, where the feed gas stream 102 is contacted with a caustic solution stream 103 of sodium hydroxide and water in a counter current flow arrangement. The caustic solution stream 103 can range from about 1 wt % NaOH to over 50 wt % NaOH in water. Alternatively, the caustic solution stream 103 can range from about 1 wt % KOH to over 50 wt % KOH in water. As the feed gas stream 102 is contacted with the caustic solution stream 103, the hydrogen sulfide, carbon dioxide, mercaptans and other contaminants are removed from the ammonia rich vapor generating a scrubbed ammonia stream 106 that is sent to the compression train system 200 illustrated in FIG. 2 and a spent caustic stream 108 that is sent to a pump 110 to provide the pressure necessary for operation of the downstream caustic fractionator system 400 illustrated in FIG. 4. The caustic solution 103 thus, removes hydrogen sulfide, carbon dioxide, mercaptans and other contaminants from the ammonia-rich feed gas stream 102.

Figure 1B:
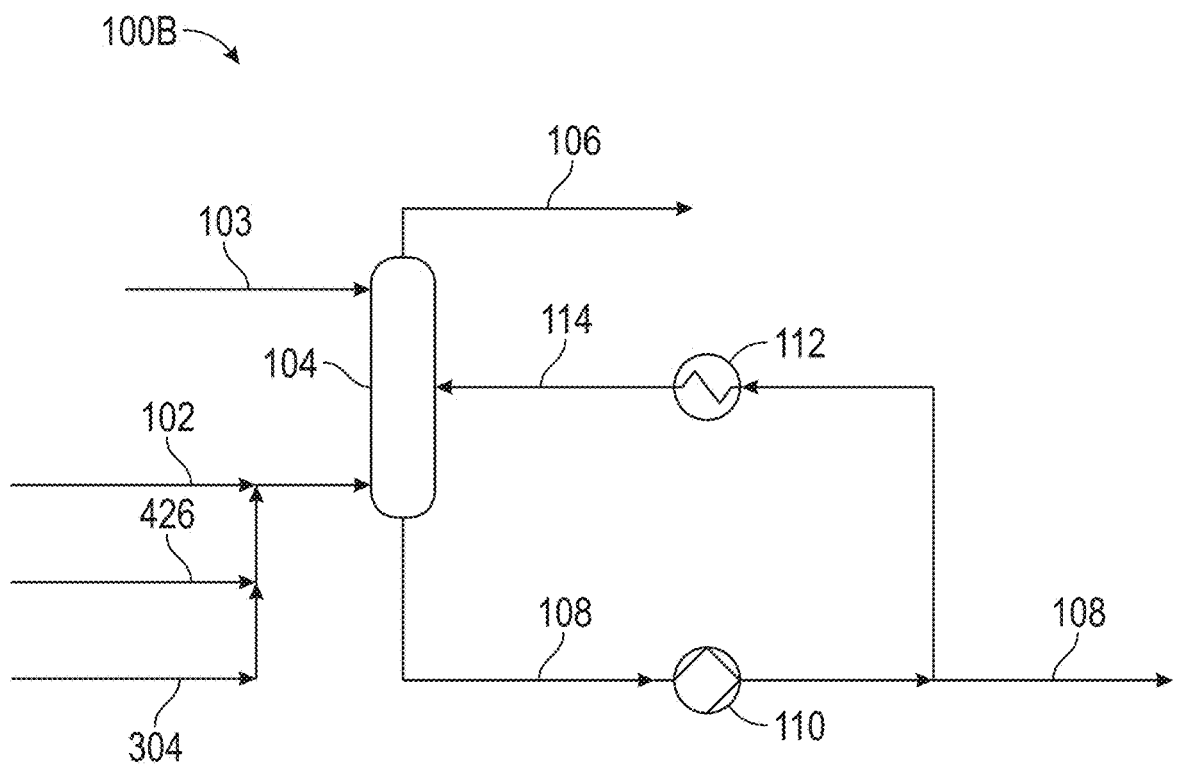
FIG. 1B is a schematic diagram illustrating another embodiment of a caustic scrubber system with a caustic wash for ammonia purification.

Referring now to FIG. 1B, a schematic diagram illustrates another alternative embodiment of a caustic scrubber system 100B with a caustic wash for ammonia purification. There may be times when the caustic scrubber 104 needs to operate at a lower temperature than that available with the feed gas stream 102 and the caustic solution stream 103 temperatures and flow rates. When cooler temperatures are required, the caustic scrubber system 100B may be effectively used. The pump 110 capacity is increased so that a portion of the spent caustic stream 108 may be diverted through a recycle cooler 112 and the cooled spent caustic stream 114 returned to the caustic scrubber 104. Another portion of the spent caustic stream 108 is sent from pump 110 to the downstream caustic fractionator system 400 illustrated in FIG. 4 for its operation. If additional pressure is required for proper operation of the caustic scrubber 104, then a compressor may be added to the feed gas stream 102.

Compression Train System

Figure 2:
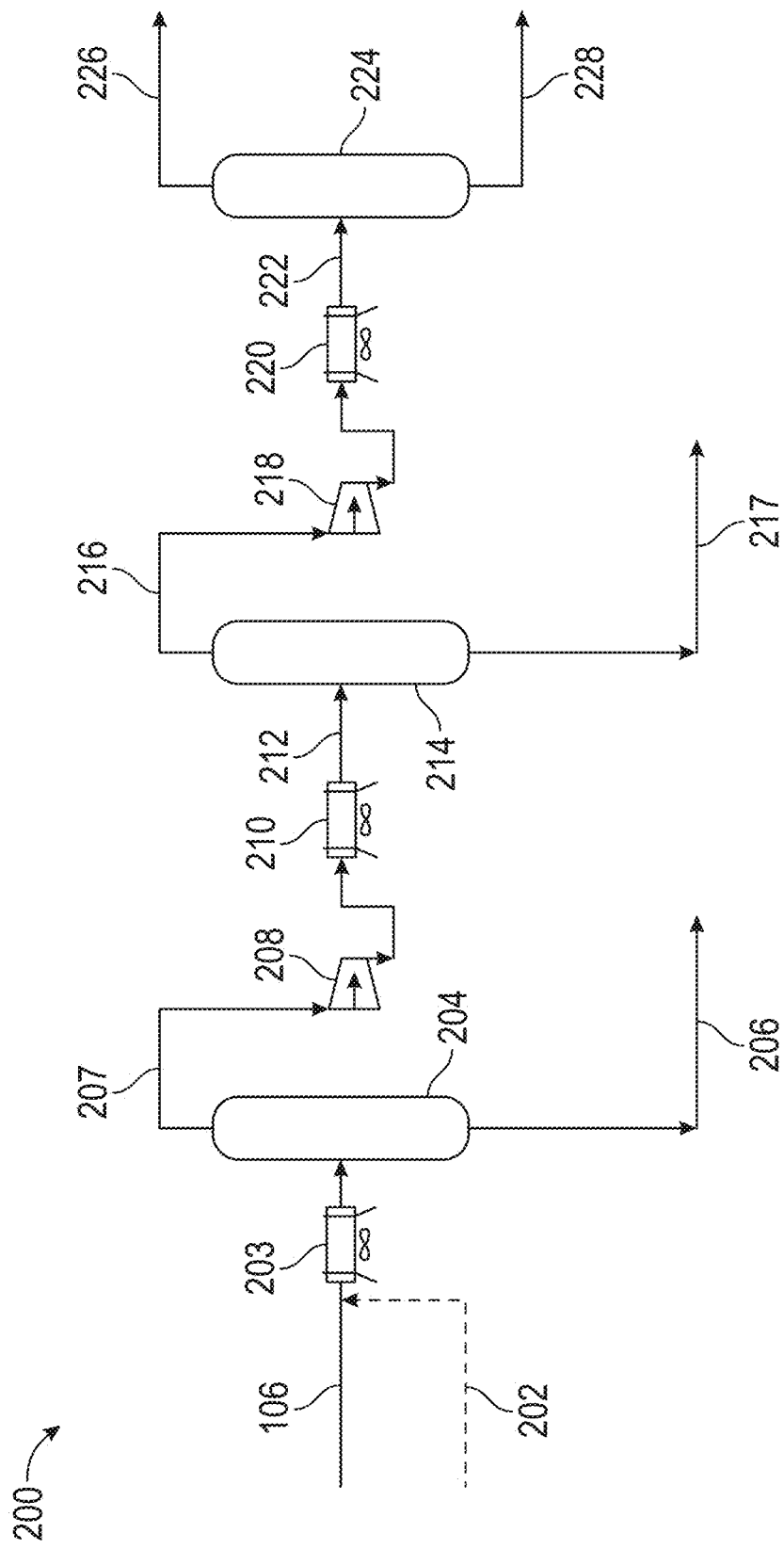
FIG. 2 is a schematic diagram illustrating one embodiment of a compression train system with a water wash for ammonia purification.

Referring now to FIG. 2, a schematic diagram illustrates one embodiment of a compression train system 200 with a water wash for ammonia purification. The compression train system 200 may include up to four compression stages. Each compression stage contains a compressor suction drum, an ammonia compressor, and a condenser cooler. Each condenser cooler effectively functions as a heat exchanger that may be air cooled (as shown) or water cooled. Feed to the compression train system 200 includes the scrubbed ammonia stream 106 and, optionally, an independent liquid water stream 202. Additional independent liquid water streams 202 may be included via a respective water spray nozzle after each ammonia compressor and/or each condenser cooler to increase the removal of impurities in the sour water liquid stream 217. A first condenser cooler 203 may be optionally included to cool the scrubbed ammonia stream 106 and (optional) liquid water stream 202.

The first stage compressor suction drum 204 separates the scrubbed ammonia stream 106 and the (optional) liquid water stream 202 into a waste water liquid stream 206 that is purged from the compression train system 200 and a caustic vapor stream 207 that is sent to a first stage ammonia compressor 208. The first stage ammonia compressor 208 raises the pressure of the caustic vapor stream 207, which is then sent downstream to a second condenser cooler 210. The cooled condensed stream 212, which contains vapor and potentially some liquid (primarily liquid water with some ammonia, hydrogen sulfide, carbon dioxide, mercaptans and other contaminants), is sent to a second stage compressor suction drum 214. The second stage compressor suction drum 214 separates the cooled condensed stream 212 into a sour water liquid stream 217 that is sent to the ammonia stripper system 300 illustrated in FIG. 3 and an ammonia vapor stream 216 that is sent to a second stage ammonia compressor 218.

After removal of most of the water from the ammonia vapor stream 216, the ammonia vapor stream 216 is compressed in the second stage ammonia compressor 218 in preparation for liquification of the ammonia. The liquefaction can require multiple compression and cooling stages to achieve the appropriate temperature and pressure required for liquification of the ammonia. The second stage ammonia compressor 218 raises the pressure of the ammonia vapor stream 216, which is sent downstream to a third condenser cooler 220. The cooled condensed stream 222 is then sent to an ammonia separator 224 where it is separated into a non-condensable vapor stream 226 and an anhydrous ammonia liquid stream 228. Additional pressure and cooling may be required for the anhydrous ammonia liquid stream 228 to meet the required product pressure and temperature requirements.

Ammonia Stripper System

Figure 3:
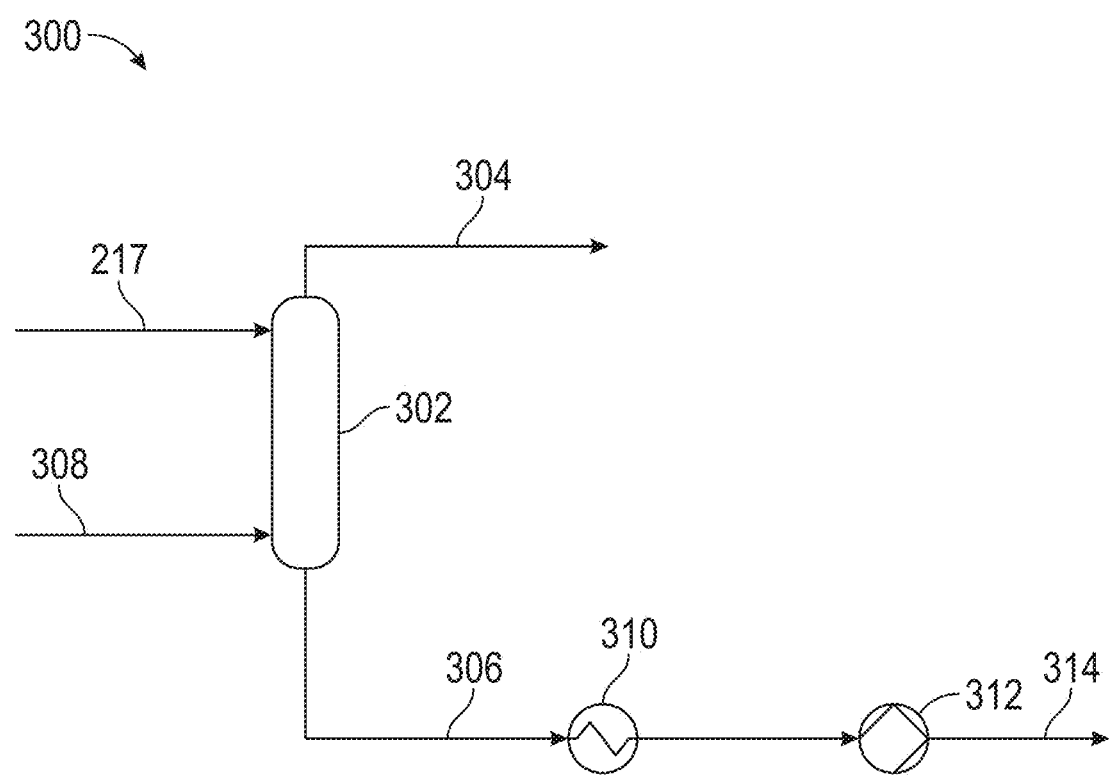
FIG. 3 is a schematic diagram illustrating one embodiment of an ammonia stripper system for ammonia purification.

Referring now to FIG. 3, a schematic diagram illustrates one embodiment of an ammonia stripper system 300 for ammonia purification. The sour water liquid stream 217 from the compression train system 200 is sent to an ammonia stripper 302 to separate the sour water stream 217 into an ammonia vapor stream 304 and a liquid effluent stream 306 comprising stripped water. The ammonia vapor stream 304 may include trace quantities of hydrogen sulfide, carbon dioxide, mercaptans and other contaminants that are contained in the sour water liquid stream 217. The ammonia vapor stream 304 may be returned to the caustic scrubber 104 in FIG. 1A or FIG. 1B for reprocessing and recovery of ammonia and removal of hydrogen sulfide, carbon dioxide, mercaptans and other contaminants. In the event there are very little to no mercaptans in the sour water liquid stream 217, the ammonia vapor stream 304 may be returned, instead, to the compression train system 200 in FIG. 2 and thereby save reprocessing of the ammonia vapor stream 304 in the caustic scrubber 104. The liquid effluent stream 306 may be sent to a cooler 310 and then a pump 312 to provide the liquid effluent stream 314 at the pressure and temperature required for downstream processing. Alternatively, the liquid effluent stream 306 may be sent the pump 312 followed by cooler 310.

An independent live steam stream 308 may also be used to strip ammonia from the sour water liquid stream 217 and improve the overall recovery of ammonia. For very large systems or alternate energy sources, a reboiler may be used to generate the live steam required for stripping ammonia from the sour water liquid stream 217. The live steam stream 308 flow rate may be adjusted to meet the requirements for the liquid effluent stream 314.

Caustic Fractionator System

Figure 4:
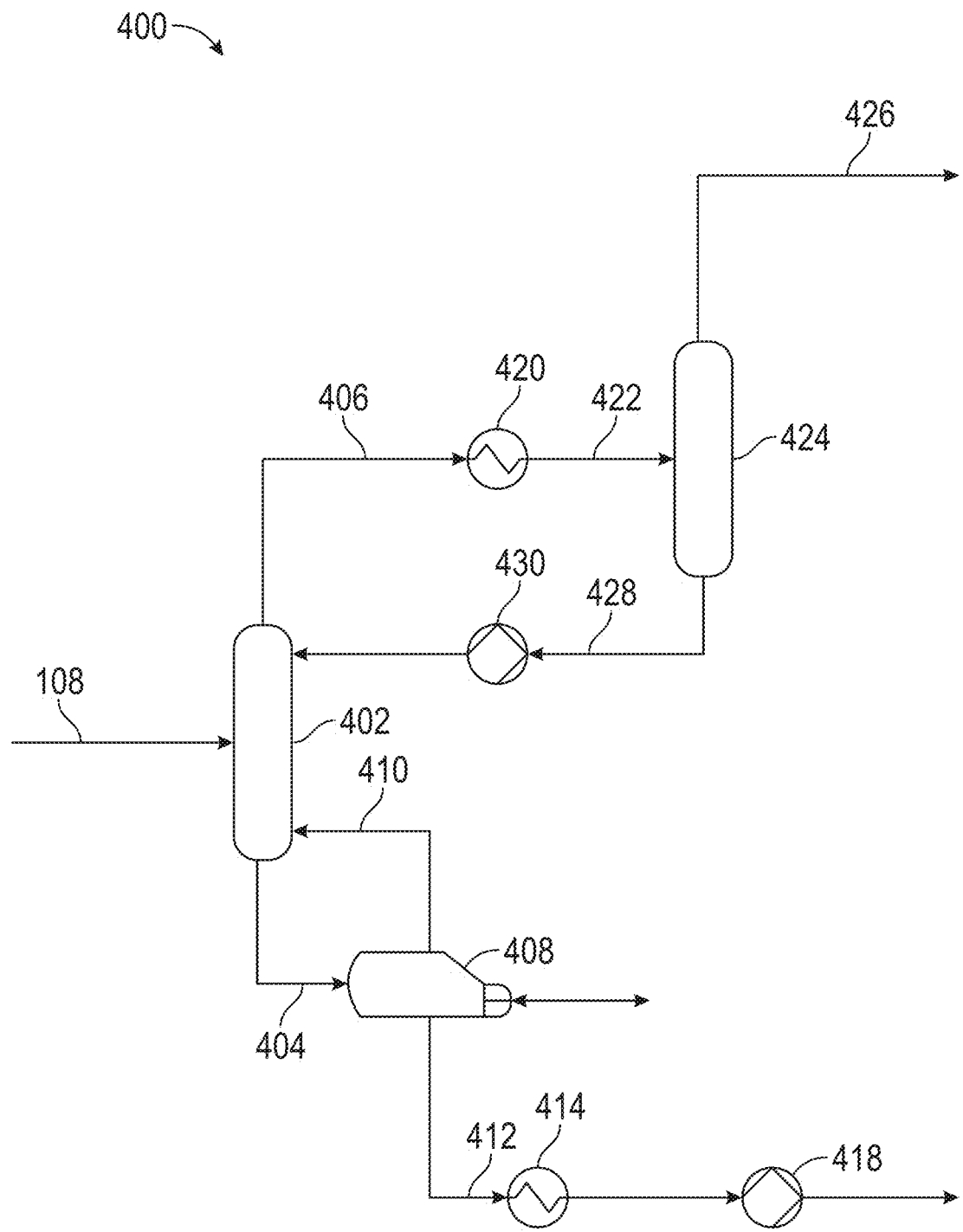
FIG. 4 is a schematic diagram illustrating one embodiment of a caustic fractionator system for ammonia purification.

Referring now to FIG. 4, a schematic diagram illustrates one embodiment of a caustic fractionator system 400 for ammonia purification. The spent caustic stream 108 from the caustic scrubber system 100A or 100B is pumped to a caustic fractionator 402 for processing and recovery of ammonia. The spent caustic stream 108 enters the caustic fractionator 402, which produces a liquid bottom stream 404 comprising water, caustic, hydrogen sulfide, carbon dioxide, mercaptans, and other contaminants and an overhead vapor stream 406 comprising ammonia and some water vapor. The liquid bottom stream 404 is used as a feed for a reboiler 408, which produces a reboiler vapor stream 410 primarily comprising heated water and ammonia and a reboiler liquid stream 412 primarily comprising heated water, caustic, hydrogen sulfide, carbon dioxide, mercaptans, and other contaminants. The reboiler vapor stream 410 flows counter current to the spent caustic stream 108 in the bottom of the caustic fractionator 402 to facilitate stripping the ammonia, which flows to the upper portion of the caustic fractionator 402. Alternatively, the reboiler 408, the reboiler vapor stream 410 and the reboiler liquid stream 412 may be replaced with live steam introduced into the bottom of the caustic fractionator 402 to facilitate stripping the ammonia.

The reboiler liquid stream 412 may be sent to a cooler 414 and then a pump 418 to provide the reboiler liquid stream 412 at the temperature and pressure required for downstream processing. Alternatively, the reboiler liquid stream 412 may be sent to the pump 418 followed by the cooler 414. The overhead vapor stream 406 passes through a condenser 420 that produces a two-phased stream 422 comprising water and ammonia. The two-phase stream 422 is fed to a reflux drum 424, which separates the two-phase stream 422 into an ammonia vapor stream 426 and a liquid water stream 428. The ammonia vapor stream 426 may be recycled by sending it to the caustic scrubber 104 in FIG. 1A or FIG. 1B for reprocessing and recovery of ammonia and removal of hydrogen sulfide, carbon dioxide, mercaptans and other contaminants. The liquid water stream 428 is pumped to the top of the caustic fractionator 402 with a pump 430 and may be used as a reflux, which flows counter current to the vapors in the caustic fractionator 402 and washes out some of the caustic vapors.

By routing the spent caustic stream 108 through the caustic fractionator 402, the spent caustic stream 108 can be partially separated into the ammonia vapor stream 426 comprising a small amount of hydrogen sulfide and caustic and the liquid bottom stream 404 comprising most of the caustic, carbon dioxide, mercaptans, other contaminants and a trace amount of ammonia.

While the present disclosure has been described in connection with presently preferred embodiments, it will be understood by those skilled in the art that it is not intended to limit the disclosure of those embodiments. It is, therefore, contemplated that various alternative embodiments and modifications may be made to the disclosed embodiments without departing from the spirit and scope of the disclosure defined by the appended claims and equivalents thereof.

The invention claimed is:

1. A system for ammonia purification, which comprises:
a caustic scrubber in fluid communication with a feed gas stream, a caustic solution stream, a first ammonia vapor stream and a second ammonia vapor stream for producing a scrubbed ammonia stream and a spent caustic stream;
a compression train system with at least two compression stages for separating the scrubbed ammonia stream into a non-condensable vapor stream and an anhydrous ammonia liquid product stream;
an ammonia stripper for separating a sour water liquid stream into the first ammonia vapor stream and a liquid effluent stream;
a caustic fractionator in fluid communication with the spent caustic stream for producing a liquid bottom stream and an overhead vapor stream;
a condenser in fluid communication with the overhead vapor stream for producing a two-phase stream comprising water and ammonia; and
a reflux drum for separating the two-phase stream into a liquid water stream and the second ammonia vapor stream.

2. The system of claim 1, wherein the compression train system comprises:
a first stage compressor suction drum for separating the scrubbed ammonia stream into a wastewater liquid stream and a caustic vapor stream;
a first stage ammonia compressor for raising the pressure of the caustic vapor stream;
a first stage heat exchanger downstream of the first stage ammonia compressor for cooling the caustic vapor stream;
a second stage compressor suction drum downstream of the first stage heat exchanger for separating the caustic vapor stream into a third ammonia vapor stream and the sour water liquid stream;
a second stage ammonia compressor for raising the pressure of the third ammonia vapor stream;
a second stage heat exchanger downstream of the second stage ammonia compressor for cooling the third ammonia vapor stream; and
an ammonia separator downstream of the second stage heat exchanger for separating the third ammonia vapor stream into the non-condensable vapor stream and the anhydrous ammonia liquid product stream.

3. The system of claim 1, wherein the caustic solution stream comprises about 1 wt % NaOH to about 50 wt % NaOH in water.

4. The system of claim 1, wherein the caustic solution stream comprises greater than 50 wt % NaOH in water.

5. The system of claim 1, wherein the caustic solution stream comprises about 1 wt % KOH to about 50 wt % KOH in water.

6. The system of claim 1, wherein the caustic solution stream comprises greater than 50 wt % KOH in water.

7. The system of claim 2, further comprising a pre-stage heat exchanger in fluid communication with the scrubbed ammonia stream and upstream of the first stage compressor suction drum.

8. The system of claim 7, further comprising another liquid water stream in fluid communication with the scrubbed ammonia stream and upstream of the pre-stage heat exchanger.

9. The system of claim 7, wherein the pre-stage heat exchanger, the first stage heat exchanger and the second stage heat exchanger each comprise an air-cooled condenser cooler.

10. The system of claim 1, further comprising an independent live steam stream in fluid communication with the ammonia stripper.

11. A method for ammonia purification, which comprises:
introducing a feed gas stream, a caustic solution stream, a first ammonia vapor stream and a second ammonia vapor stream into a caustic scrubber for producing a scrubbed ammonia stream and a spent caustic stream;
separating the scrubbed ammonia stream into a sour water liquid stream, a non-condensable vapor stream and an anhydrous ammonia liquid product stream;
separating the sour water liquid stream into the first ammonia vapor stream and a liquid effluent stream;
introducing the spent caustic stream a caustic fractionator for producing a liquid bottom stream and an overhead vapor stream;

introducing the overhead vapor stream into a condenser for producing a two-phase stream comprising water and ammonia; and separating the two-phase stream into a liquid water stream and the second ammonia vapor stream.

12. The method of claim 11, wherein the scrubbed ammonia stream is separated into the non-condensable vapor stream and the anhydrous ammonia liquid product stream by a compression train system with at least two compression stages.

13. The method of claim 11, wherein the sour water liquid stream is separated into the first ammonia vapor stream and the liquid effluent stream by an ammonia stripper.

14. The method of claim 11, wherein the two-phase stream is separated into the liquid water stream and the second ammonia vapor stream by a reflux drum.

15. The method of claim 11, wherein the caustic solution stream comprises about 1 wt % NaOH to about 50 wt % NaOH in water.

16. The method of claim 11, wherein the caustic solution stream comprises greater than 50 wt % NaOH in water.

17. The method of claim 11, wherein the caustic solution stream comprises about 1 wt % KOH to about 50 wt % KOH in water.

18. The method of claim 11, wherein the caustic solution stream comprises greater than 50 wt % KOH in water.

19. The method of claim 12, further comprising introducing another liquid water stream into the compression train system at one of a position upstream of the at least two compression stages and a position downstream one of the at least two compression stages.

20. The method of claim 13, further comprising introducing an independent live steam stream into the ammonia stripper.

* * * * *